(12) United States Patent
Sedarat (10) Patent No.: US 10,135,641 B1
(45) Date of Patent: Nov. 20, 2018

(54) FAR END CROSSTALK CANCELLATION FOR SERDES LINKS

(71) Applicant: Aquantia Corporation, San Jose, CA (US)

(72) Inventor: Hossein Sedarat, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 0 days.

(21) Appl. No.: 15/398,583

(22) Filed: Jan. 4, 2017

(51) Int. Cl.
*H04L 27/22* (2006.01)
*H04L 25/03* (2006.01)

(52) U.S. Cl.
CPC .. *H04L 25/03057* (2013.01); *H04L 25/03885* (2013.01)

(58) Field of Classification Search
CPC ..... H04L 25/4904; H04L 1/205; H04L 25/02; H04L 7/0331; H03M 5/12; G06F 13/4022
USPC ............ 375/333, 332, 221, 295; 455/73, 74; 370/295, 430
See application file for complete search history.

(56) References Cited

U.S. PATENT DOCUMENTS

| 9,294,313 | B2* | 3/2016 | Prokop | H04L 25/03057 |
| 2009/0304054 | A1* | 12/2009 | Tonietto | H04L 1/205 375/221 |
| 2011/0038286 | A1* | 2/2011 | Ta | H04Q 11/02 370/295 |
| 2012/0216084 | A1* | 8/2012 | Chun | H04L 25/02 714/708 |
| 2015/0012677 | A1* | 1/2015 | Nagarajan | G06F 13/4022 710/106 |
| 2015/0180760 | A1* | 6/2015 | Rickard | H04L 43/50 370/252 |

* cited by examiner

*Primary Examiner* — Khai Tran
(74) *Attorney, Agent, or Firm* — Lance Kreisman; Peninsula Patent Group (57) ABSTRACT

A serializer-deserializer (SerDes) integrated circuit (IC) chip includes a first SerDes receiver circuit having a first input for coupling to a first SerDes link, and a first output. A second SerDes receiver circuit has a second input for coupling to a second SerDes link. The second SerDes receiver circuit includes a second output. Crosstalk filter circuitry is disposed between the first SerDes receiver circuit and the second SerDes receiver circuit.

11 Claims, 6 Drawing Sheets

FIG. 6

FAR END CROSSTALK CANCELLATION FOR SERDES LINKS

TECHNICAL FIELD

The disclosure herein relates to signaling systems, and more specifically to high-speed serializer-deserializer (SerDes) links, systems and associated methods.

BACKGROUND

Serializer-deserializer (SerDes) devices provide a straightforward way to transmit input data from a wide parallel interface to a single, or serial, data output path. A given link generally includes a transmit circuit on a first integrated circuit (IC) device coupled to a receive circuit on a second IC device via a single-ended or differential signaling path. The relative simplicity of SerDes links make them amenable to a variety of circuit applications.

However, with ever-increasing data rates and circuit integration, SerDes links are becoming susceptible to problems such as inter-symbol interference (ISI), signal echoes, and signal crosstalk. Many of these problems become worse for architectures where multiple adjacent links operate at very high speeds. It would be desirable to address such issues without overly complex circuitry.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of serializer-deserializer (SerDes) circuits, links and associated methods are disclosed. For one embodiment, a serializer-deserializer (SerDes) integrated circuit (IC) chip includes a first SerDes receiver circuit having a first input for coupling to a first SerDes link, and a first output. A second SerDes receiver circuit has a second input for coupling to a second SerDes link. The second SerDes receiver circuit includes a second output. Crosstalk filter circuitry is disposed between the first SerDes receiver circuit and the second SerDes receiver circuit. By employing cross-coupled crosstalk cancellation circuitry, the SerDes links may operate at significantly higher data rates while still minimizing circuit complexity.

Figure 1:
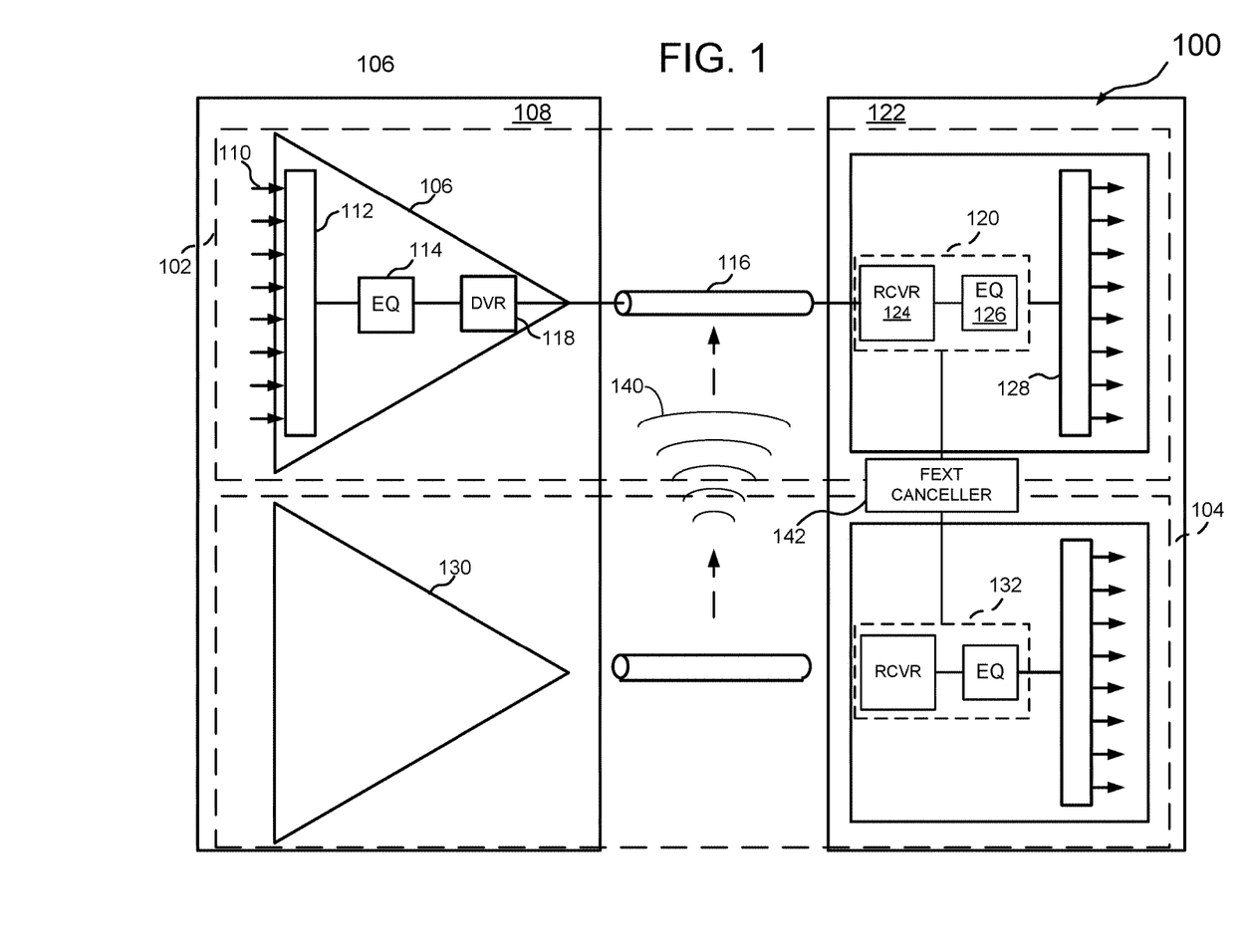
FIG. 1 illustrates multiple serializer-deserializer (SerDes) links that are cross-coupled by crosstalk cancellation circuitry in accordance with one embodiment.

FIG. 1 is a block diagram illustrating one embodiment of a SerDes link architecture that includes a first SerDes link 102 and a second SerDes link 104. The first link 102 includes transmit circuitry 106 formed on a first integrated circuit (IC) chip 108. The transmit circuitry includes a parallel input data interface 110 to receive data from multiple input data paths in a parallel fashion. A serializer 112 receives the parallel data and converts the data to a serialized bitstream. The serialized data may be equalized by a transmit side equalizer 114, such as a precoder, and driven along a channel 116 by a driver 118. The channel may be single-ended or differential, depending on the application.

Further referring to FIG. 1, the channel 116 terminates in a receiver circuit 120 formed on a second IC chip 122. The receiver circuit 120 includes a receiver 124 such as a sampler, and an equalizer 126, such as a decision-feedback equalizer (DFE). The output of the DFE feeds a serial-to-parallel converter 128 that assembles the serialized data back into parallel format.

With continued reference to FIG. 1, the second link 104 is formed similar to the first link 102, and in some embodiments employs transmit circuitry 130 that is formed on the same core IC chip 108 as the transmit circuitry 106 for the first link 102. Receiver circuitry 132 for the second link 104 may also be formed on the same IC chip 122 as the receiver circuitry 120 of the first link 102. Additionally, while FIG. 1 shows only transmit circuitry on the first IC 108, and receive circuitry on the second IC 122, in practice, each link may be a bidirectional link, such that a given link includes transmit and receive (transceiver circuitry) at each end of the link while sharing the same channel.

To address crosstalk that may affect data signals between the links 102 and 104, shown at 140, one embodiment employs far-end crosstalk (FEXT) cancellation circuitry 142 between the first receiver circuit 120 and the second receiver circuit 132. For one embodiment, the crosstalk cancellation circuitry 142 is realized through the use of one or more adaptive filters that continually adapt, and are more particularly realized as finite impulse response (FIR) filters.

Figure 2:
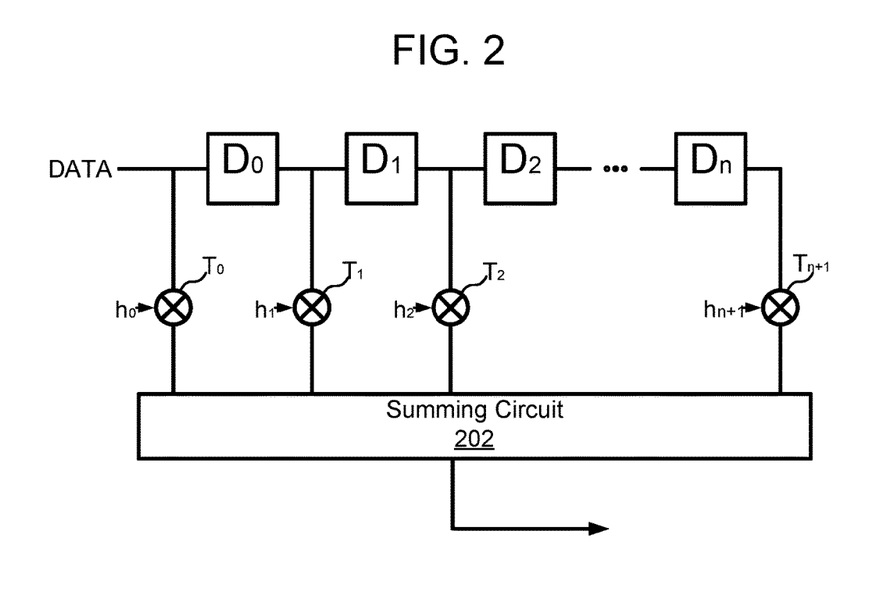
FIG. 2 illustrates a flowchart of steps for one embodiment of a method for characterizing a crosstalk channel between the SerDes links of FIG. 1.

While the structure and operation of FIR filters are generally well-known to those skilled in the art, FIG. 2 illustrates one embodiment of a high-level implementation that includes a plurality of delay elements D0-Dn, for delaying respective data samples DATA. A number of taps $T_0$-$T_n$ corresponding to the delay elements are respectively coupled to delay output nodes. The taps receive respective weights or coefficients h0-hn+1 that represent gain factors applied to a sequence of data samples in a weighted manner. A summing circuit 202 receives the weighted samples from the taps, averages them, and outputs a filtered value. The filter input generally operates in the digital domain, receiving a digital input for processing, and generating an analog output.

Figure 3:
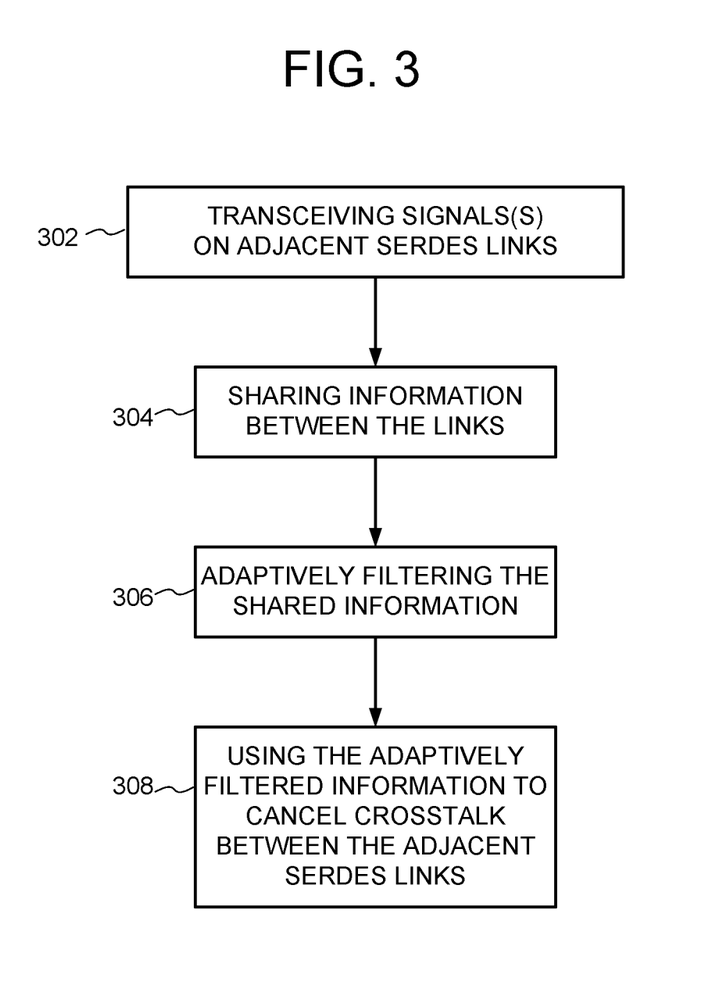
FIG. 3 illustrates further detail of a finite impulse response filter (FIR) architecture that may be employed in the crosstalk canceller filter circuitry of FIG. 1.

FIG. 3 illustrates a flow diagram illustrating one embodiment of a method, generally designated 300, that is consistent with the systems and circuitry described herein. The method includes transceiving signals on adjacent SerDes links, at step 302, and sharing information between the SerDes links, at step 304. As described more fully above, the information is associated with crosstalk from different SerDes links that are available on the same SerDes core chip. The information is adaptively filtered, at step 306, in a continuous fashion, and used to cancel crosstalk between the adjacent SerDes links, at step 308.

Figure 4:
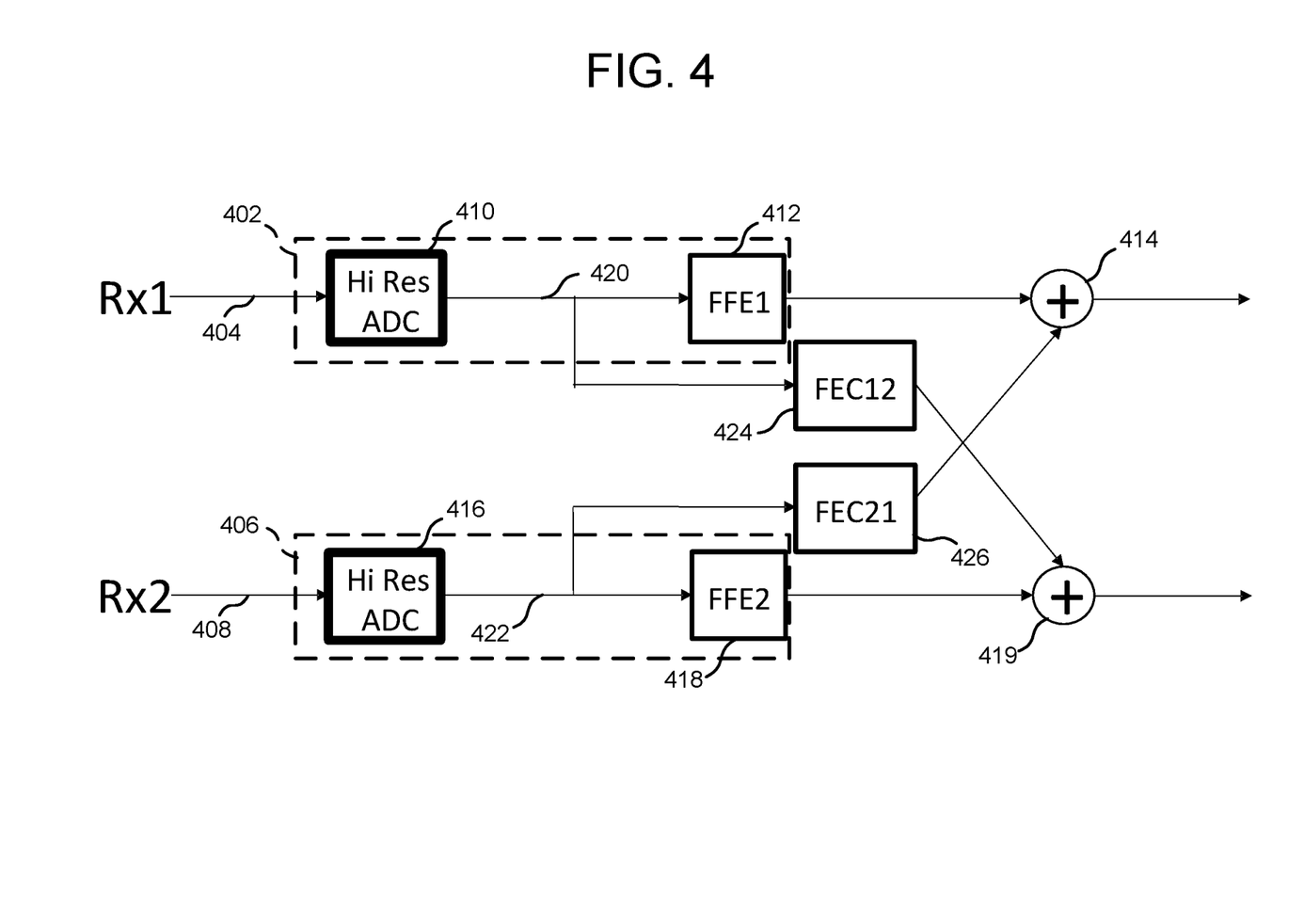
FIG. 4 illustrates one embodiment of a receive-side feed-forward crosstalk cancelling filter architecture.

Referring now to FIG. 4, one specific embodiment of a receive-side crosstalk cancellation architecture is shown. The architecture is a feed-forward configuration that includes a first receiver circuit 402 associated with a first SerDes link 404 and a second receiver circuit 406 associated with a second SerDes link 408. The first receiver circuit 402 includes a high-resolution analog-to-digital converter (ADC) 410 that receives a serialized bitstream from a first link channel (not shown), and converts the analog bitstream into digital information. A feed-forward equalizer (FFE) 412 receives the digital information, equalizes the data, and feeds the equalized data to a summing circuit 414. The second receiver circuit 406 is formed similar to the first receiver circuit 402, with a high-resolution ADC 416, an FFE 418, and a second summer 419.

Further referring to FIG. 4, to take advantage of the digitized data outputs at 420 and 422 from each of the ADCs, a first adaptive crosstalk filter 424 is coupled from the output of the first ADC 410 to an input of the second summer 419, and a second adaptive crosstalk filter 426 is coupled between the output of the second ADC 416 and an input of the first summer 414. When converged on respective optimal solutions, the compensation provided by each of the filters 424 and 426 effectively cancels a significant amount, or all, of the crosstalk affecting each link.

Figure 5:
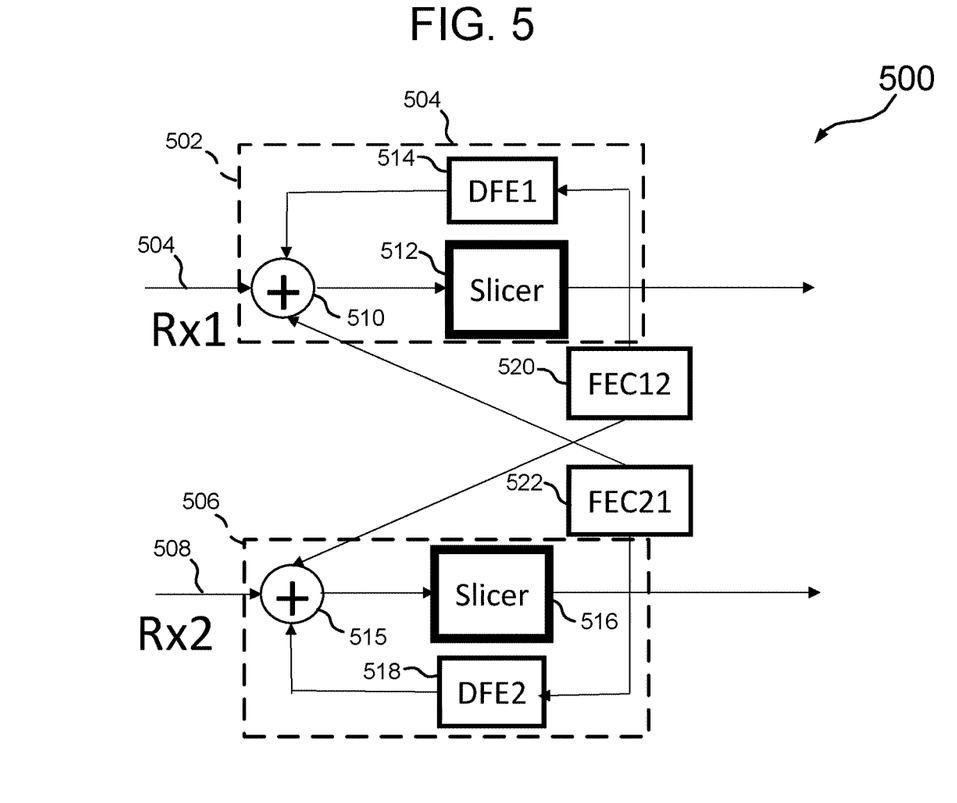
FIG. 5 illustrates one embodiment of a receive-side feedback crosstalk cancelling filter architecture.

FIG. 5 illustrates a further embodiment of a receive-side crosstalk cancellation circuit, generally designated 500, that is similar to that of FIG. 5, but employs a feedback configuration rather than a feed-forward configuration. The architecture includes a first receiver circuit 502 associated with a first SerDes link 504 and a second receiver circuit 506 associated with a second SerDes link 508. The first receiver circuit 502 includes a first summer 510 that receives a serialized bitstream from the first link 504, and outputs the analog bitstream into a slicer 512 for determination of the bit values ("0" or "1"). A decision-feedback equalizer (DFE) 514 taps the slicer output, equalizes the data, and feeds the equalized data to the first summing circuit 510. The second receiver circuit 506 is formed similar to the first receiver circuit 502, with an associated summer 515, a slicer circuit 516 and a DFE 518.

Further referring to FIG. 5, to take advantage of the digitized data output from each of the slicers 512 and 516, a first adaptive crosstalk filter 520 is coupled from the output of the first slicer 512 to an input of the second summer 515, and a second adaptive crosstalk filter 522 is coupled between the output of the second slicer 516 and an input of the first summer 510. When converged on respective optimal solutions, the compensation provided by each of the filters 520 and 522 effectively cancels a significant amount, or all, of the crosstalk affecting each link.

In this embodiment, the use of a high resolution ADC may be eliminated in certain circumstances. The Slicer is generally at the boundary between the analog and digital domains of the receiver. The Slicer typically maps the receive signal to the closest valid constellation point (e.g. one of PAM2 or PAM4 levels). The digital sliced values, which have typically lower resolution than the ADC in the first embodiment, are then fed to the FEXT cancellers (similar to what is done for the DFE) and the output of the FEC is used to cancel the crosstalk in analog domain. Since the input to the FEC has typically lower resolution than that of first embodiment, the FEC filters may be much simpler in this embodiment. In order to compensate the propagation delay skew between links, the transmitter may add some delay to the FEC paths as well as the transmitted data. This delay may be communicated from the receivers to the transmitters during initialization of the link and at training time.

Figure 6:
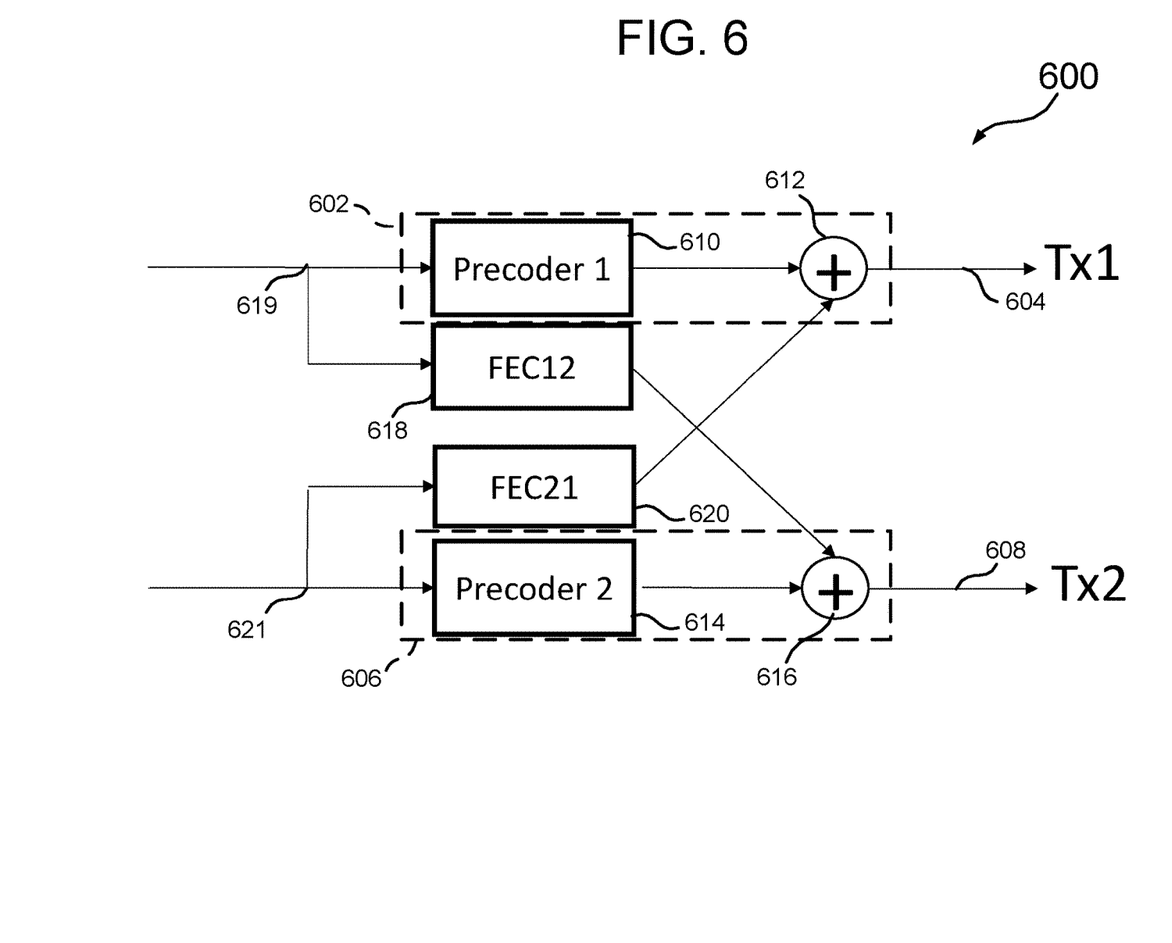
FIG. 6 illustrates one embodiment of a transmit-side crosstalk cancelling architecture.

FIG. 6 illustrates one embodiment of a transmit-side crosstalk cancellation circuit, generally designated 600. The architecture includes a first transmit circuit 602 associated with a first SerDes link 604 and a second transmit circuit 606 associated with a second SerDes link 608. The first transmit circuit 602 includes a first precoder 610 that receives a serialized digital bitstream from a first serializer (not shown), and outputs an analog bitstream into a first summer 612 for feeding to a first driver (not shown). The second transmit circuit 606 is formed similar to the first transmit circuit 602, with an associated precoder 614 and summer 616.

Further referring to FIG. 6, a first adaptive crosstalk filter 618 taps into a digital input 619 of the precoder 610 and generates an analog output for the second summer 616. A second adaptive crosstalk filter 620 taps into the digital input 621 of the second precoder 614 and generates an analog output for the first summer 612. While the architectures of FIGS. 5 and 6 are advantageous in their own ways, they still depend on circuitry to convert the serialized bitstream into digital information for the adaptive filter inputs. At the transmitter end of each link 604 and 608, however, the bitstream is already in digital format due to the use of the digital precoder equalizer circuits 610 and 614. Thus, utilizing the transmit side embodiment to carry out crosstalk cancellation minimizes any additional circuitry and complexity.

This embodiment may also eliminate the need for a high resolution ADC. The input to the FEC (similar to the precoder) is the digital modulated signal at one of the valid constellation levels. This input data has typically lower resolution than the ADC used in the first embodiment, hence simplifying the implementation of the FEC filter. The precoders and FECs, which may be at the boundary of the digital and analog domains in the transmitter, can have a low resolution datapath according to the modulation used (e.g. PAM2 or PAM4). In this embodiment, the propagation delay skew between links may be compensated by adding an appropriate number of digital delay elements in the path of precoders and FECs. The filter coefficients and the number delay elements may be communicated from far-end receivers to the transmitters.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A serializer-deserializer (SerDes) integrated circuit (IC) chip comprising:
    a first SerDes receiver circuit having a first input for coupling to a first SerDes link, the first SerDes receiver circuit including a first analog-to-digital (ADC) converter having a first analog input and a first digital output;
    a second SerDes receiver circuit having a second input for coupling to a second SerDes link, the second SerDes receiver circuit including a second analog-to-digital (ADC) converter having a second analog input and a second digital output; and
    crosstalk filter circuitry configured in a feed-forward architecture and disposed between the first SerDes receiver circuit and the second SerDes receiver circuit, wherein the crosstalk filter circuitry includes
        a first summing circuit to receive a version of the output from the first ADC,
        a second summing circuit to receive a version of the output from the second ADC,
        a first crosstalk filter coupling the output of the first ADC to the second summing circuit, and
        a second crosstalk filter coupling the output of the second ADC to the first summing circuit.

2. The SerDes IC chip according to claim 1, wherein the first crosstalk filter and the second crosstalk filter are in the form of adaptive finite impulse response (FIR) filters.

3. The SerDes IC chip according to claim 1, further comprising:
    first equalization circuitry disposed between the output of the first ADC and the first summing circuit; and
    second equalization circuitry disposed between the output of the second ADC and the second summing circuit.

4. A serializer-deserializer (SerDes) integrated circuit (IC) chip comprising:
    a first SerDes receiver circuit having a first input for coupling to a first SerDes link, the first SerDes receiver circuit including a first summing circuit having a first output, and a first slicer circuit having a first input coupled to the first output and a first slicer output;
    a second SerDes receiver circuit having a second input for coupling to a second SerDes link, the second SerDes receiver circuit includes a second summing circuit having a second output, and a second slicer circuit having a second input coupled to the second output, the second slicer circuit having a second slicer output; and
    crosstalk filter circuitry configured in a feedback architecture and disposed between the first SerDes receiver circuit and the second SerDes receiver circuit wherein the crosstalk filter circuitry includes
        a first crosstalk filter configured to feed back the output of the first slicer to the second summing circuit, and
        a second crosstalk filter configured to feed back the output of the second slicer to the first summing circuit.

5. The SerDes IC chip according to claim 4, wherein the first crosstalk filter and the second crosstalk filter are in the form of adaptive finite impulse response (FIR) filters.

6. The SerDes IC chip according to claim 4, further comprising:
    first equalization circuitry disposed between the output of the first slicer and the first summing circuit; and
    second equalization circuitry disposed between the output of the second slicer and the second summing circuit.

7. The SerDes IC chip according to claim 6, wherein the first equalization circuitry and the second equalization circuitry comprise decision-feedback equalizer (DFE) circuits.

8. A serializer-deserializer (SerDes) integrated circuit (IC) chip comprising:
    a first SerDes transmit circuit having a first transmit output for coupling to a first SerDes link, the first SerDes transmit circuit including a first data input and a first summing circuit having a first input and a first output;
    a second SerDes transmit circuit having a second transmit output for coupling to a second SerDes link, the second SerDes transmit circuit including a second data input and a second summing circuit having a second input and a second output; and
    crosstalk filter circuitry configured in a feed-forward architecture and disposed between the first SerDes transmit circuit and the second SerDes transmit circuit, wherein the crosstalk filter circuitry includes
a first crosstalk filter configured to feed the input of the first transmit circuit to the second summing circuit, and
a second crosstalk filter configured to feed the input of the second transmit circuit to the first summing circuit.

9. The SerDes IC chip according to claim 8, wherein the first crosstalk filter and the second crosstalk filter are in the form of adaptive finite impulse response (FIR) filters.

10. The SerDes IC chip according to claim 8, further comprising:
first equalization circuitry disposed between the input of the first transmit circuit and the first summing circuit; and
second equalization circuitry disposed between the input of the second transmit circuit and the second summing circuit.

11. The SerDes IC chip according to claim 10, wherein the first equalization circuitry and the second equalization circuitry comprise precoder circuits.

\* \* \* \* \*